United States Patent Office 2,763,453
Patented Sept. 18, 1956

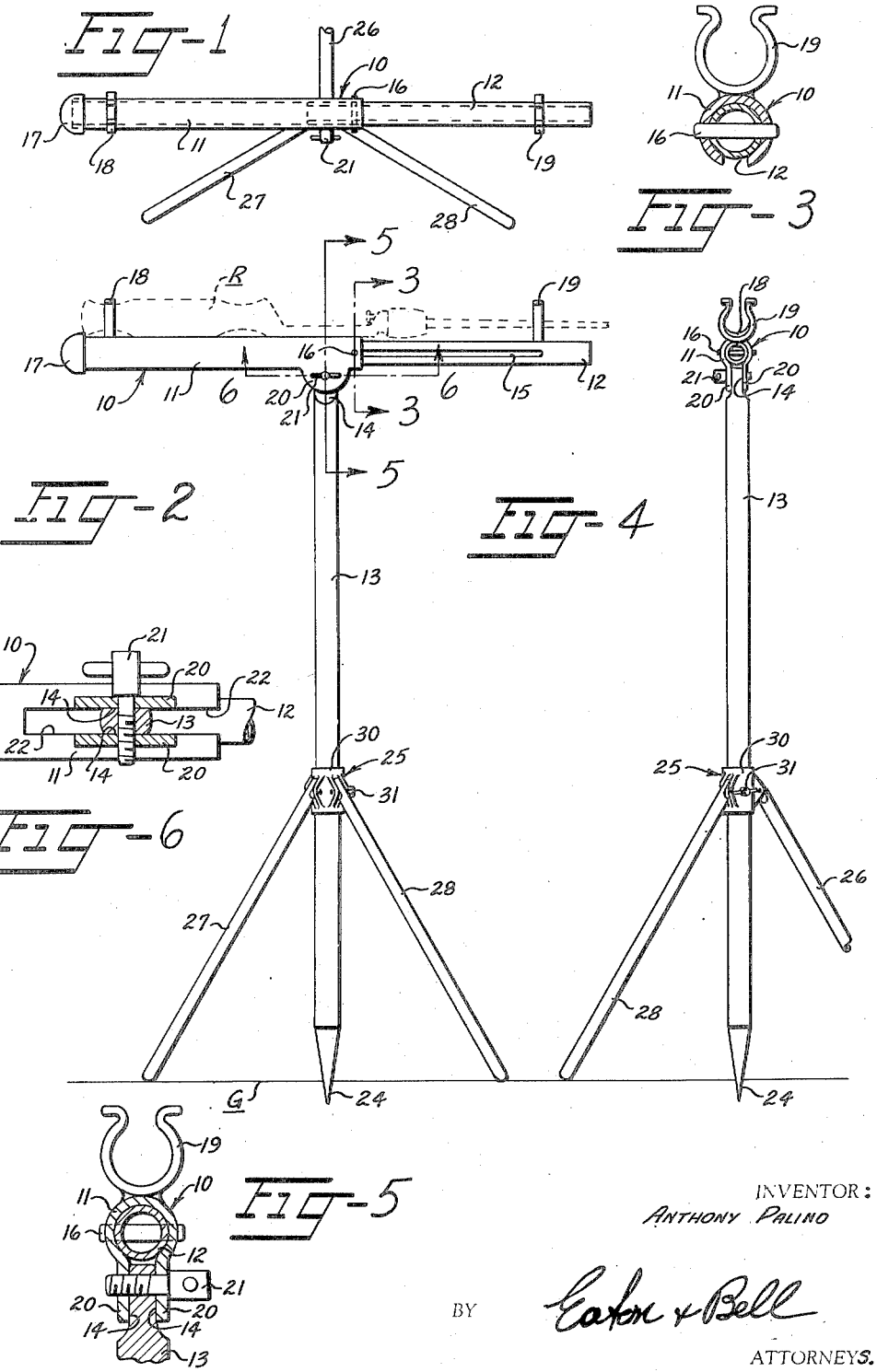

2,763,453

COLLAPSIBLE ROD HOLDER

Anthony Palino, Charlotte, N. C.

Application May 7, 1953, Serial No. 353,482

1 Claim. (Cl. 248—44)

This invention relates to collapsible holders for rods and more especially to an adjustable collapsible holder for fishing rods and the like.

It is an object of this invention to provide a fishing rod holder which is collapsible and which may be readily set up and which is adjustable as to horizontal angularity.

It is another object of this invention to provide a fishing rod holder having a transverse telescopic member which may be adjusted to receive and secure any length of fishing rod and which transverse telescopic member is adjustable as to horizontal angularity.

It is more specifically an object of this invention to provide a fishing rod holder having a single vertical shaft with a tripod arrangement slidably mounted thereon adjacent its lower end and adapted to support said vertical member. A transverse telescopic member is pivotally secured to the upper end of the vertical shaft and said telescopic member has a plurality of spring clamps thereon adapted to engage and secure a fishing rod or the like therein.

It is another object of this invention to provide clamping means for adjusting the length of the telescopic members and the position thereof relative to the vertical shaft.

Some of the objects of the invention having been stated, other objects will appear as the description proceeds when taken in connection with the accompanying drawings in which—

Figure 1 is a top plan view of the fishing rod holder with the fishing rod removed;

Figure 2 is a side elevation of the fishing rod holder showing a portion of a fishing rod in association therewith;

Figure 3 is an enlarged vertical sectional view taken along the line 3—3 in Figure 2;

Figure 4 is a front elevation of the fishing rod holder with the fishing rod removed;

Figure 5 is an enlarged vertical sectional view taken along the line 5—5 in Figure 2;

Figure 6 is an enlarged inverted sectional plan view taken along the line 6—6 in Figure 2.

Referring more specifically to the drawings it will be observed that the rod holder comprises a transverse telescopic member 10 having a tubular portion 11 and a slidable portion 12 together with a vertical shaft 13 having opposed flats 14 adjacent the upper end thereof. The slidable portion 12 is slidably mounted within the confines of the tubular portion 11, said portion 12 having opposed longitudinally extending slots 15 therein penetrated by a pin 16 fixed in the end of the member 11 for securing the portion 12 within the tubular portion 11. The other end of the portion 11 is sealed as by a cap 17. Suitable spring clamps 18 and 19 are fixedly secured to the upper surfaces of the portions 11 and 12, respectively, said spring clamps being provided for the reception of a fishing rod or the like R. In this connection, it should be noted that the telescopic feature of the rod holder permits accommodation of a rod R of any desired length.

The telescopic member 10 is connected to the upper end of the shaft 13 by a pair of outwardly extending ears or flanges 20 adapted to fit over the flats 14, said ears preferably being formed integral with the tubular portion 11 adjacent one end thereof, and one of said ears 20 and the shaft 13 being slidably penetrated by a wing screw 21 which threadably penetrates the opposite flange 20. It is thus apparent that the telescopic member 10 may be readily adjusted to any desired degree of horizontal angularity relative to the vertical shaft 13 by manipulation of the wing screw 21.

It will be observed in Figure 6 that the transverse tubular portion 11 has a longitudinally extending slot 22 in the under surface thereof, said slot communicating with the front end of the portion 11 remote from the cap 17 and extending rearwardly therefrom to a point substantially beyond the flanges 20. The slot 22 gives a clamping effect to the front end of the portion 11 and this clamping effect serves to automatically secure the slidable portion 12 within the portion 11 upon the wing screw 21 being tightened to secure the transverse telescopic member 10 to the shaft 13 at a desired angle relative thereto.

The lower end of the vertical shaft 13 terminates in a point 24 adapted to be driven into the ground G thereby maintaining the vertical shaft 13 in a substantially upright position. A tripod 25 is removably secured to the lower end portion of the vertical shaft 13, said tripod comprising spaced legs 26, 27 and 28 hingedly connected to a sleeve 30 slidably mounted on the shaft 13. The sleeve 30 is removably secured on the shaft 13 as by a wing screw 31 which threadably penetrates the sleeve 30 and bears against the shaft 13.

The tripod 25 may be removed, if desired, when the rod holder 10 is used on soft or swampy ground, or it may be utilized to support the rod holder on hard or rocky ground, or on a flat hard surface such as a dock or a boat.

The transverse telescopic member 10 and the tripod 25 may be readily removed from the shaft 13 to facilitate transportation of the rod holder by merely loosening the respective wing screws 21 and 31. By connecting the telescopic member 10 to the shaft 13 at a point intermediate the opposite ends of the portions 11 and 12, it is possible to maintain the same and the rod carried thereby in a horizontal position which is frequently desirable.

It is to be understood that although the spring clamps 18 and 19 are illustrated in the drawings as being substantially the same size, that, if desired, the spring clamp 19 may be of smaller diameter than the spring clamp 18 in order to accommodate the relatively thin shaft of a fishing rod R of the type illustrated in Figure 2.

It is thus seen that there is provided a simple and inexpensive collapsible telescopic rod holder which will readily accommodate any desired length of rod and is adjustable for maintaining said rod at any desired degree of angularity.

In the drawings and specification, there has been set forth a preferred embodiment of the invention and, although specific terms are employed, they are used in a generic and descriptive sense only, and not for purposes of limitation, the scope of the invention being defined in the claim.

I claim:

A fishing rod holder comprising a tubular member, a slidable portion telescopically mounted in the tubular member, the slidable portion having opposed longitudinally extending slots therein, a transversely disposed pin mounted in the tubular member and extending through said slots for limiting outward movement of the slidable member relative to the tubular member, each of the portions having rod holding means on their upper sides, the tubular member having a pair of spaced downwardly projecting ears adjacent the end which receives the slidable member, said tubular member having a longitudinally extending slot in its lower surface communicating with the end of the tubular member which receives the slidable member and disposed between the downwardly projecting ears for permitting said end portion of the tubular member to be reduced in diameter to frictionally clamp the slidable portion, a support for the tubular member having a flattened upper end adapted to fit between the ears, and a clamping bolt penetrating the ears and said support for clamping the tubular member and slidable member together and to said support.

References Cited in the file of this patent

UNITED STATES PATENTS

| | | |
|---|---|---|
| 989,386 | Miller | Apr. 11, 1911 |
| 1,456,304 | Fritschka | May 22, 1923 |
| 1,619,152 | Nunlist | Mar. 1, 1927 |
| 1,873,615 | McIntosh | Aug. 23, 1932 |
| 2,438,388 | Dolk | Mar. 23, 1948 |
| 2,566,496 | Montano | Sept. 4, 1951 |
| 2,584,687 | Fidler | Feb. 5, 1952 |
| 2,624,536 | Herzog | Jan. 6, 1953 |

FOREIGN PATENTS

| | | |
|---|---|---|
| 135,848 | Austria | Dec. 11, 1933 |